June 8, 1926.
A. E. MILLER
AUTOMOBILE NOVELTY
Filed August 28, 1924
1,588,127
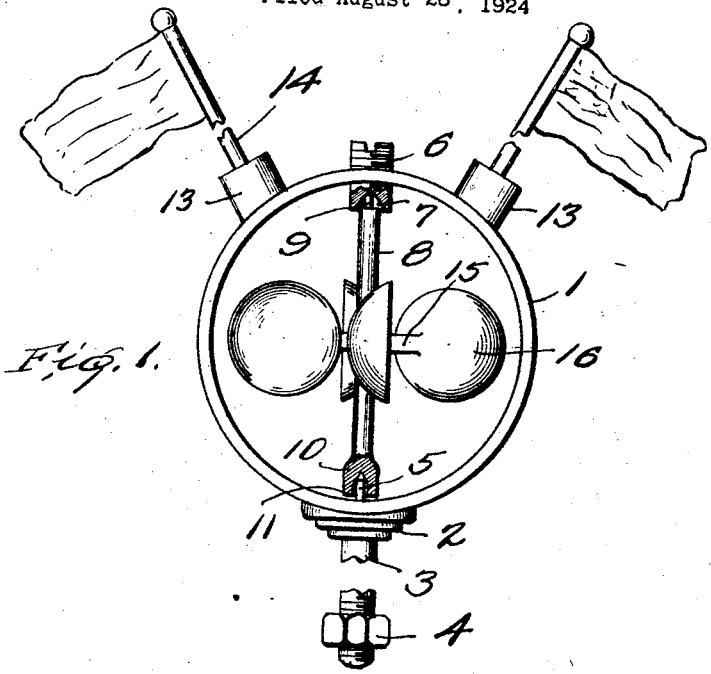
Fig. 1.
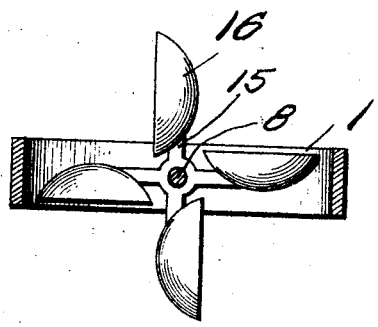
Fig. 2.
Witness
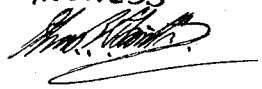
Inventor
A. E. Miller
By 
Attorney Patented June 8, 1926.

1,588,127

UNITED STATES PATENT OFFICE.

ALVAH E. MILLER, OF SOMERVILLE, NEW JERSEY.

AUTOMOBILE NOVELTY.

Application filed August 28, 1924. Serial No. 734,819.

The present invention appertains to a novelty particularly designed for use upon automobiles having means whereby it may be mounted on the radiator cap or the like.

A prime object of the invention is to provide a device of this nature which will attract attention as the automobile is in motion or whenever the wind is blowing.

Another very important object of the invention is to provide a simple and efficient device of this nature which is attractive in appearance, reliable, inexpensive to manufacture, durable, strong, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:—

Figure 1 is an elevation of the device embodying the features of my invention, details thereof being shown in section, and Figure 2 is a transverse section taken therethrough.

Referring to the drawing in detail it will be seen that the frame 1 is circular in the form of a ring and is provided on its exterior surface with a boss 2 from which projects a bolt 3 threaded for the reception of a nut 4. This stud bolt 3 may be inserted through the radiator cap or the like in the usual manner and held in place by means of the nut 4. On the interior surface of the ring frame 1 adjacent the boss 2 there is provided a pintle 5 having a pointed end. At a diametrically opposite point from the pintle 5 there is disposed a journal screw 6 passing through the ring frame 1 and having its inner end recessed as at 7. A shaft 8 is provided at one end with a pintle 9 to be received within recess 7 of the screw journal 6 while its other end is provided with a head 10 having a recess 11 therein for the reception of pintle 5. Thus this shaft is journaled so as to rotate freely within the frame 1.

Two sockets 13 are disposed on the exterior of the ring 1 preferably one on each side of the screw journal 6 in order that the flagstaff 14 may be received therein.

A plurality of arms 15 radiate from the intermediate portion of shaft 8 and have mounted on their terminals cup shaped members 16. It will thus be seen that when the automobile moves forwardly the shaft 8 will be rotated by the air being caught into the cup shaped members 16. This shaft will also be rotated when the automobile is standing still if there is sufficient wind or breeze blowing. The shaft may be very easily disassembled merely by unscrewing the journal screw 6. It is to be seen that the device I have produced is not only ornamental but affords a very cheap, simple, and attractive novelty for radiator caps and the like. It is evident that changes in the details of construction, and in the combination and arrangement of parts may be resorted to without departing from the spirit or scope of the invention as hereinafter claimed or sacrificing any of its advantages.

Having thus described my invention, what I claim as new is:—

An automobile radiator cap attachment comprising an annulus adapted to be attached to the radiator cap to extend in a vertical plane, a vertically extending pin carried by the inner face of the annulus, an adjustable bearing threaded through the annulus at a point diametrically opposite the pin and provided with a recess upon its inner face, a rotor including a vertical shaft having a recess in its lower end which loosely receives the pin, the upper end of the shaft being loosely accommodated in the recess in the adjustable bearing.

In testimony whereof I affix my signature.

ALVAH E. MILLER.